(12) United States Patent
Brock et al.

(10) Patent No.: US 12,364,357 B2
(45) Date of Patent: Jul. 22, 2025

(54) CENTRIFUGAL COFFEE EXTRACTION WITH VACUUM LOADING

(71) Applicant: 87 North Enterprises, LLC, Saratoga Springs, NY (US)

(72) Inventors: Kyle Brock, Queensbury, NY (US); E. Ryan Miller, Lake George, NY (US)

(73) Assignee: 87 NORTH ENTERPRISES, LLC, Saratoga Springs, NY (US)

( * ) Notice: Subject to any disclaimer, the term of this patent is extended or adjusted under 35 U.S.C. 154(b) by 0 days.

(21) Appl. No.: 18/833,575

(22) PCT Filed: Dec. 21, 2023

(86) PCT No.: PCT/US2023/085340
§ 371 (c)(1),
(2) Date: Jul. 26, 2024

(87) PCT Pub. No.: WO2024/137935
PCT Pub. Date: Jun. 27, 2024

(65) Prior Publication Data
US 2025/0204716 A1 Jun. 26, 2025

Related U.S. Application Data

(60) Provisional application No. 63/476,716, filed on Dec. 22, 2022.

(51) Int. Cl.
*A47J 31/22* (2006.01)
*A23F 5/26* (2006.01)

(52) U.S. Cl.
CPC .............. *A47J 31/22* (2013.01); *A23F 5/26* (2013.01)

(58) Field of Classification Search
CPC .................................. A47J 31/22; A23F 5/26
See application file for complete search history.

(56) References Cited

U.S. PATENT DOCUMENTS

| 6,532,862 B2 | 3/2003 | Mork et al. |
| 9,603,479 B2 | 3/2017 | Yoakim et al. |

(Continued)

FOREIGN PATENT DOCUMENTS

| CN | 209106997 | 7/2019 |
| CN | 215127656 | 12/2021 |

(Continued)

OTHER PUBLICATIONS

International Search Report and Written Opinion issued on Mar. 13, 2024 for International Patent Application No. PCT/US2023/085340.

*Primary Examiner* — Anthony J Weier
(74) *Attorney, Agent, or Firm* — Shumaker, Loop & Kendrick, LLP; Jonathan M. Hines

(57) ABSTRACT

A coffee extraction apparatus includes: a housing with an exterior wall extending between a lower end and an upper end, wherein the lower end defines a sump; a basket disposed within the housing and mounted for rotation about an axis, the basket including a plurality of openings sized to permit the passage of liquid therethrough while preventing the passage of solids above a predetermined size; a driver operable to spin the basket about the axis; a supply container configured to be loaded with dry coffee grounds; a loading pipe extending between the supply container and the housing; an outlet pipe extending between the housing and a collection container; and means for generating an air flow from the supply container through the loading pipe into the housing.

15 Claims, 3 Drawing Sheets

(56) References Cited

U.S. PATENT DOCUMENTS

| | | |
|---|---|---|
| 10,729,274 B2 | 8/2020 | Ewing |
| 2010/0266739 A1 | 10/2010 | van Hattem |
| 2011/0003046 A1 | 1/2011 | Yoakim et al. |
| 2013/0206014 A1 | 8/2013 | Jarisch et al. |
| 2014/0242239 A1 | 8/2014 | Boggavarapu |
| 2017/0215627 A1 | 8/2017 | Fung |
| 2018/0000108 A1* | 1/2018 | Boggavarapu ...... A47J 31/5251 |
| 2019/0290052 A1 | 9/2019 | Dubief et al. |
| 2020/0093315 A1 | 3/2020 | Burrows |
| 2020/0268192 A1 | 8/2020 | Dubief |
| 2021/0030193 A1 | 2/2021 | Rivera |
| 2021/0037847 A1 | 2/2021 | Hoon et al. |
| 2021/0298515 A1 | 9/2021 | Lee et al. |

FOREIGN PATENT DOCUMENTS

| | | |
|---|---|---|
| EP | 2119383 | 11/2009 |
| EP | 3244747 | 1/2022 |
| FR | 2535597 | 5/1984 |
| GB | 887212 | 1/1962 |
| JP | 11215951 | 8/1999 |
| JP | 2016178875 | 10/2016 |
| KR | 101673479 | 11/2016 |
| KR | 102072808 | 2/2020 |
| KR | 102171689 | 10/2020 |
| WO | 2022145556 | 7/2022 |

\* cited by examiner

CENTRIFUGAL COFFEE EXTRACTION WITH VACUUM LOADING

BACKGROUND OF THE INVENTION

This invention relates generally to coffee extraction and more particularly to cold brew processes.

Coffee is produced by roasting and grinding coffee beans to produce coffee grounds. The grounds are contacted with water that is heated (and sometimes pressurized) to extract flavor compounds from the grounds, resulting in a finished beverage.

So-called "cold brew" coffees are becoming more popular. Cold brew coffee differs from conventional hot-brewed coffee in that the water is supplied at relatively low temperature. Compared to hot-brewed coffee, cold brew coffee typically has a lower acidity and a greater concentration of caffeine. In prior art practice, extraction of cold brew coffee requires that the coffee grounds be contacted with water over an extended period of time, typically hours or days.

BRIEF SUMMARY OF THE INVENTION

This shortcoming of the prior art is addressed by the technology described herein, which describes an apparatus and method for extraction of cold brew coffee.

According to one aspect of the technology described herein, a coffee extraction apparatus includes: a housing with an exterior wall extending between a lower end and an upper end, wherein the lower end defines a sump; a basket disposed within the housing and mounted for rotation about an axis, the basket including a plurality of openings sized to permit the passage of liquid therethrough while preventing the passage of solids above a predetermined size; a driver operable to spin the basket about the axis; a supply container configured to be loaded with dry coffee grounds; a loading pipe extending between the supply container and the housing; and means for generating an air flow from the supply container through the loading pipe into the housing.

According to another aspect of the technology described herein, a method of producing cold brew coffee includes: using air flow to load coffee grounds from a supply container into an extraction apparatus, the apparatus including: a housing with an exterior wall extending between a lower end and an upper end, wherein the lower end defines a sump; a basket disposed within the housing and mounted for rotation about an axis, the basket including a plurality of openings sized to permit the passage of liquid therethrough while preventing the passage of solids above a predetermined size; and a driver operable to spin the basket about the axis; introducing water at a temperature of substantially less than 98 degrees Celsius into the basket; using the driver to rotate the basket, thereby forcing the water through the coffee grounds, producing cold brew coffee which collects in the sump.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
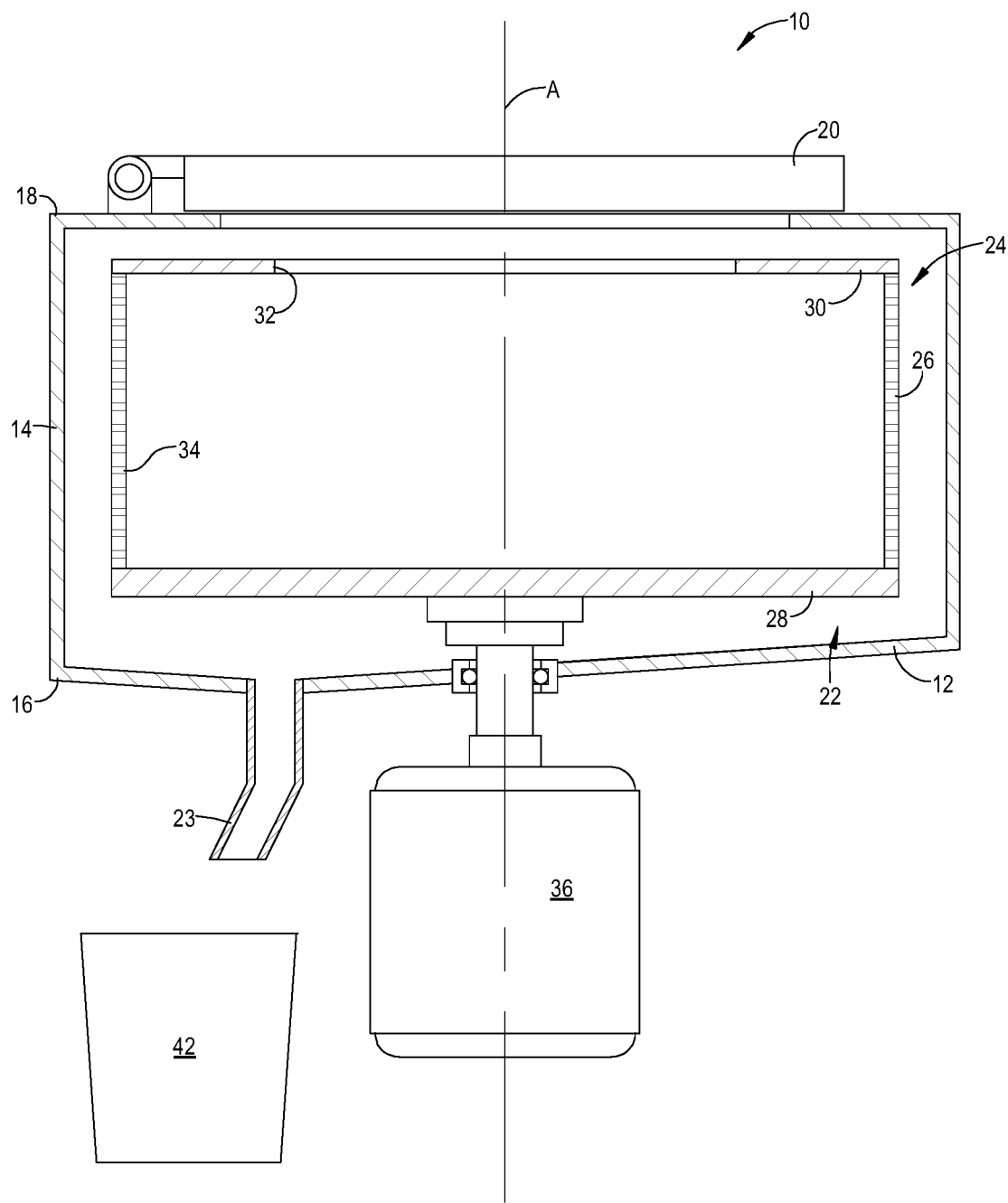
FIG. 1 is a schematic, partially-sectioned side view of an exemplary centrifuge.

Referring to the drawings wherein identical reference numerals denote the same elements throughout the various views, FIG. 1 illustrates a centrifuge 10 which may be used to produce a cold brew coffee beverage.

The centrifuge 10 includes a housing 12 with an exterior wall 14 extending between a lower end 16 and an upper end 18. The upper end 18 may be closed off by a movable cover 20. The lower end 16 defines a sump 22 which is sloped towards an outlet pipe 23.

A basket 24 is disposed within the housing 12 and mounted for rotation about an axis "A". In the illustrated example, the basket 24 is generally cylindrical and includes an annular peripheral wall 26 extending between a bottom plate 28 and a top plate 30. The top plate 30 includes a central feed opening 32. Optionally, the top plate 30 may be detachable from the remainder of the basket 24. For example, it could be coupled to the peripheral wall 26 using threaded fasteners, tabs, pins, or latches (not shown).

The peripheral wall 26 includes a plurality of openings 34 such as holes, slots, perforations, or orifices. The size of the openings 34, their shape, spacing, total number and total open area may be selected to suit a particular application. Typically, the openings are sized to permit the passage of liquid therethrough while preventing the passage of solids above a certain predetermined size. Optionally, a screen (not shown) may be positioned around the interior of the peripheral wall 26. The openings in the screen may be smaller than the openings 34 in the peripheral wall 26.

The basket 24 is mechanically coupled to a driver 36. The driver 36 is operable to spin the basket 24 about axis A at a desired rotational speed (RPM). The centripetal acceleration produced by the centrifuge (measured in G units) depends upon the rotational speed of the basket 24 and the diameter of the basket 24. Commercially available centrifuges are capable of producing accelerations in the range of 800 to 2000 G. This acceleration is colloquially referred to as "centrifugal force". It has the effect of strongly pressing any material within the basket 24 against the inner surface of the peripheral wall 26. If the basket 24 contains solids of various sizes or a combination of solids and liquids, the effect of the centrifuge 10 is to retain the solids against the inner surface of the peripheral wall 26, while forcing liquids or small-sized solids through the openings 34. They then fall into the sump 22 and collect by gravity at the location of the outlet pipe 23.

Typically, centrifuges are used to remove liquid in order to produce a dry end product. Alternatively, a centrifuge may be used to force water through coffee grounds to extract flavor compounds at low temperatures, thus effectively producing a cold brew beverage.

Figure 2:
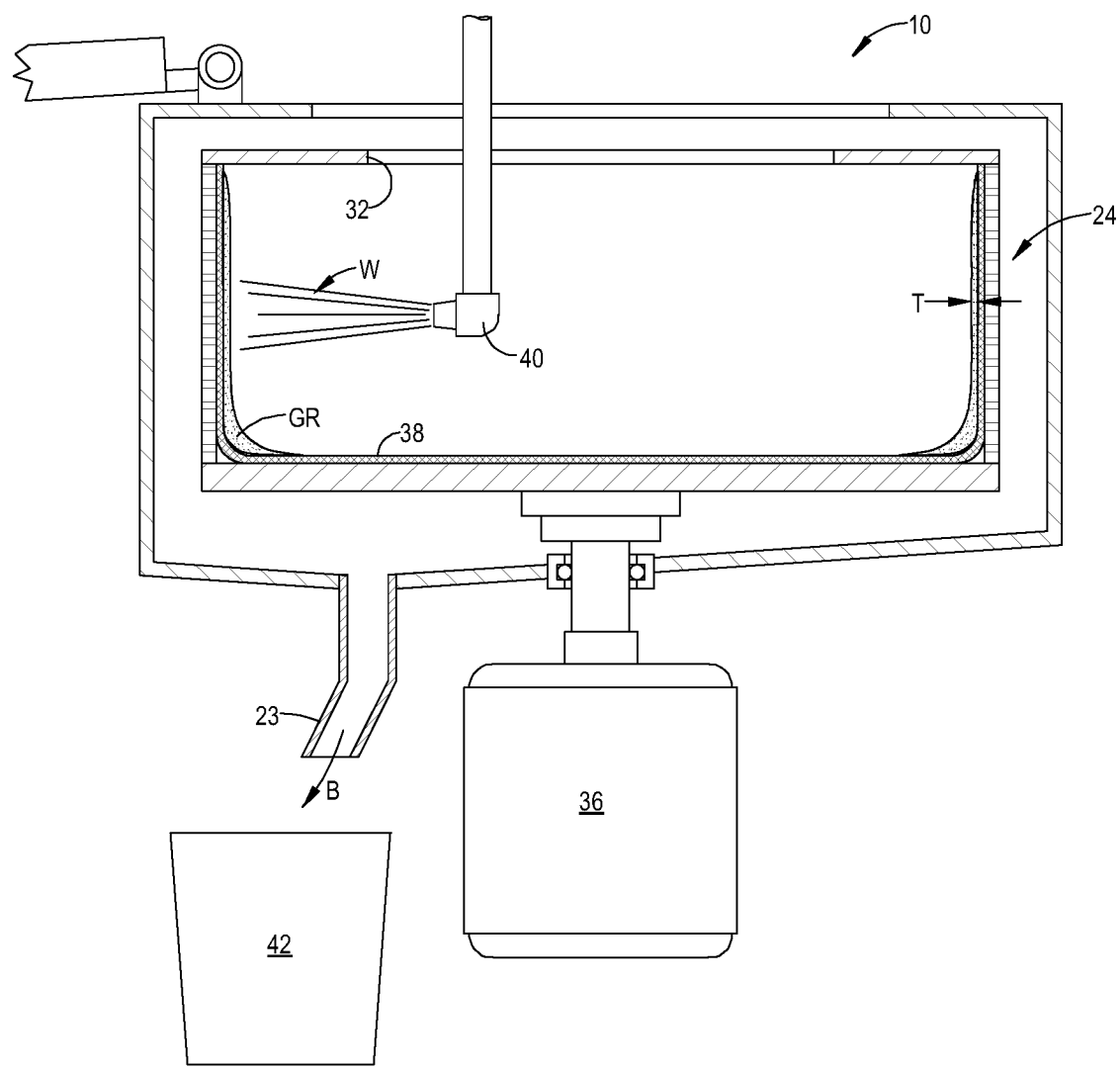
FIG. 2 is a view of the centrifuge of FIG. 1 with coffee grounds loaded therein.

Referring to FIG. 2, in one example process, the basket 24 is started into rotation and coffee grounds "GR" are loaded into the basket through the feed opening 32. In one sequence, the grounds GR are loaded while the basket 24 is stationary, then rotation is started. Alternatively, rotation may be started and then grounds GR may be introduced through the feed opening 32. The second method has been found to result in a more even distribution of the grounds GR against the peripheral wall, that is, a thickness "T" of the grounds is generally the same over the distance between the bottom plate 28 and the top plate 30. However, this method may require a user to place body parts near the moving basket. In either case, the grounds GR may be redistributed if necessary, using an appropriate tool such as a scraper (not shown). The grounds GR may be introduced in either a dry form or a pre-wetted (slurry) form.

Optionally, the grounds GR may be loaded into a filter bag 38 which is placed into the basket 24. This provides a convenient means of cleaning the basket 24, as the entire filter bag 38 with the spent grounds GR therein may simply be removed at the end of the extraction process. The filter bag 38 may be used instead of the screen described above. Optionally, the filter bag 38 may be connected to the top plate 30. This could permit easier removal of the used filter bag 38, especially in combination with a detachable top plate 30.

Once the basket 24 is operating at a desired rotational speed with the grounds GR loaded, an appropriate solvent (for example water "W") is introduced into the basket 24. As shown in FIG. 2, water W may be introduced by spraying it through a nozzle 40 towards the grounds GR. Operation of the centrifuge 10 forces the water W through the coffee grounds GR, extracting flavor compounds. Because of the action of the centrifuge 10, there is no need for the water W to be supplied at any particular pressure or velocity.

The water W may be supplied at any temperature. However, the centrifuge 10 is especially useful for producing "cold brew coffee". It is generally accepted that "cold brew" refers to any extraction temperature at ambient room temperature and below. In contrast, hot brewed coffee is typically extracted at approximately 98 degrees Celsius. Accordingly, for this process, the water W may be at substantially less than 98 degrees Celsius. In one example, the water W may have a maximum temperature of approximately 23 degrees Celsius. The centrifuge 10 is effective to produce a cold brew beverage in the amount of time it takes for the water W to flow through the coffee grounds GR in a single pass through the device. This would typically be a matter of a few seconds from leaving the nozzle 40 to being collected as an end product. Enough water is added through nozzle 40 to reach the desired yield volume and desired content of total dissolved solids (TDS) in the finished product.

The water W with dissolved flavor compounds constitutes a beverage "B", namely, cold brew coffee, which falls into the sump 22 and collects by gravity at the outlet pipe 23. This is collected in a container 42. It is then ready for further processing, such as the addition of flavorings and/or packaging. In one example, the beverage B produced directly from the centrifuge 10 would be in a concentrated form that may be diluted with water or other liquid to produce a beverage ready for consumption. Dilution may be performed by the manufacturer prior to packaging, or by the end consumer.

Figure 3:
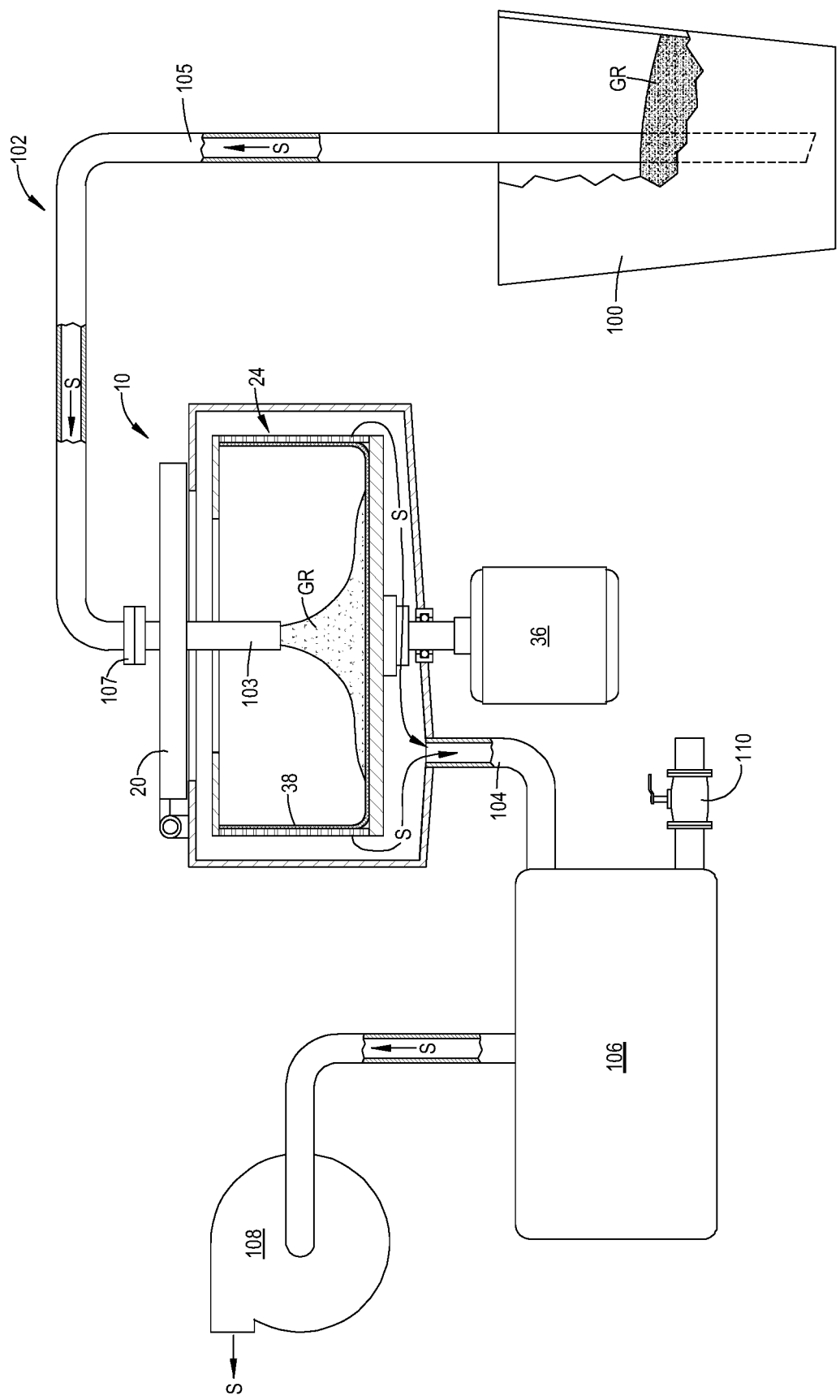
FIG. 3 is a view of the centrifuge of FIG. 1 along with a vacuum loading apparatus, showing coffee grounds being loaded.

The extraction process above has been described using a manual batch loading process for the grounds GR. Alternatively, the grounds GR may be loaded into the basket 24 using a flow transfer process. Referring to FIG. 3, a supply container 100, such as a simple open hopper, is loaded with dry grounds GR. A loading pipe 102 extends between the supply container 100 and the closed cover 20. Appropriate seals (not illustrated) would be provided to prevent air leakage between the cover 20 and the housing 12. In the illustrated example, the loading pipe 102 includes a first portion 103 extending through and permanently mounted to the cover 20, coupled to a second portion 105 at a joint 107. This permits the second portion 105 to be removed when not in use.

An outlet pipe 104 extends between the housing 12 and a collection container 106.

A vacuum source 108 such as a vacuum cleaner (e.g. shop-type vacuum or similar) is coupled to the collection container 106. Beginning with an empty basket 24, the vacuum source 108 is turned on, creating a partial vacuum in the housing 12 and the basket 24, generating a suction air flow (arrows "S") and the basket 24 is rotated. This would be at a slow speed such as 10% of top speed. This causes the grounds GR to be drawn into the basket 24 through the loading pipe 102. The slow-speed spinning distributes the grounds GR up the sides of the basket 24 in an even layer, into the shape seen in FIG. 2. This continues until the desired amount of grounds GR are loaded. Subsequently, water spray is introduced through nozzle 40 and the extraction process proceeds as described above. The finished beverage may be drained from the collection container through a drain valve 110.

As a possible alternative, the air flow for dry grounds loading could be reversed. Specifically, the grounds GR could be moved from a sealed supply container (not shown) into the housing 12 by pressurizing the supply container.

The foregoing has described an apparatus and method for producing cold brew coffee. All of the features disclosed in this specification, and/or all of the steps of any method or process so disclosed, may be combined in any combination, except combinations where at least some of such features and/or steps are mutually exclusive.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A coffee extraction apparatus, comprising:
    a housing with an exterior wall extending between a lower end and an upper end, wherein the lower end defines a sump;
    a basket disposed within the housing and mounted for rotation about an axis, the basket including a plurality of openings sized to permit the passage of liquid therethrough while preventing the passage of solids above a predetermined size;
    a driver operable to spin the basket about the axis;
    a supply container configured to be loaded with dry coffee grounds;
    a loading pipe extending between the supply container and the housing; and
    means for generating an air flow from the supply container through the loading pipe into the housing.

2. The apparatus of claim 1 wherein the supply container is an open hopper.

3. The apparatus of claim 1, wherein the basket is generally cylindrical and includes an annular peripheral wall extending between a bottom plate and a top plate, the top plate includes a central feed opening, and the plurality of openings are formed in the peripheral wall.

4. The apparatus of claim 1, further comprising a filter bag disposed in the basket.

5. The apparatus of claim 1, further comprising a nozzle positioned to spray water into the basket.

6. The apparatus of claim 1, further comprising a movable cover configured to selectively close off the upper end of the housing.

7. The apparatus of claim 6, wherein the loading pipe includes a first portion extending through and permanently mounted to the cover, coupled to a second portion at a joint.

8. The apparatus of claim 1, wherein the means for generating an air flow comprise:
- an outlet pipe extending between the housing and a collection container; and
- a vacuum source coupled to the collection container.

9. A method of producing cold brew coffee, comprising:
using air flow to load coffee grounds from a supply container into an extraction apparatus, the apparatus including:
- a housing with an exterior wall extending between a lower end and an upper end, wherein the lower end defines a sump;
- a basket disposed within the housing and mounted for rotation about an axis, the basket including a plurality of openings sized to permit the passage of liquid therethrough while preventing the passage of solids above a predetermined size; and
- a driver operable to spin the basket about the axis;

introducing water at a temperature of substantially less than 98 degrees Celsius into the basket;
using the driver to rotate the basket, thereby forcing the water through the coffee grounds, producing cold brew coffee which collects in the sump.

10. The method of claim 9, wherein the water introduced has a maximum temperature of approximately 23 degrees Celsius.

11. The method of claim 9, wherein the air flow is created by pressurizing the supply container.

12. The method of claim 9, wherein the air flow is created using apparatus comprising:
- a loading pipe extending between the supply container and the housing;
- an outlet pipe extending between the housing and a collection container; and
- a vacuum source coupled to the collection container.

13. The method of claim 9, wherein the basket is generally cylindrical and includes an annular peripheral wall extending between a bottom plate and a top plate, the top plate includes a central feed opening, and the plurality of openings are formed in the peripheral wall.

14. The method of claim 9, further comprising placing a filter bag in the basket before loading the coffee grounds into the apparatus.

15. The method of claim 9, wherein the water is introduced by using a nozzle to spray water into the basket.

* * * * *